(12) United States Patent
Wada et al.

(10) Patent No.: US 7,506,260 B2
(45) Date of Patent: Mar. 17, 2009

(54) METHOD AND SYSTEM OF PROVIDING BROWSER FUNCTIONALITY THROUGH A BROWSER BUTTON

(75) Inventors: Alan Wada, Mountain View, CA (US); Eric Burke, West Bloomfield, MI (US); Duke Tsao-Ming Fan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 344 days.

(21) Appl. No.: 10/794,705

(22) Filed: Mar. 5, 2004

(65) Prior Publication Data

US 2005/0198220 A1 Sep. 8, 2005

Related U.S. Application Data

(60) Provisional application No. 60/516,196, filed on Oct. 31, 2003.

(51) Int. Cl.
G06F 3/00 (2006.01)
G06F 3/048 (2006.01)

(52) U.S. Cl. .................. 715/738; 715/700; 715/716; 715/744; 715/838; 715/840

(58) Field of Classification Search ............. 715/700, 715/716, 738, 744, 838, 840
See application file for complete search history.

(56) References Cited

U.S. PATENT DOCUMENTS

| | | | |
|---|---|---|---|
| 5,499,335 A | 3/1996 | Silver et al. | |
| 5,630,042 A | 5/1997 | McIntosh et al. | |
| 5,736,985 A * | 4/1998 | Lection et al. | 715/840 |
| 5,744,787 A | 4/1998 | Teicher | |
| 5,781,724 A | 7/1998 | Nevarez et al. | |
| 5,784,058 A | 7/1998 | LaStrange et al. | |
| 5,796,393 A * | 8/1998 | MacNaughton et al. | 715/733 |
| 5,802,530 A | 9/1998 | Van Hoff | |
| 5,805,803 A | 9/1998 | Birrell et al. | |
| 5,813,007 A | 9/1998 | Neilsen | |
| 5,828,376 A * | 10/1998 | Solimene et al. | 715/821 |
| 5,848,424 A | 12/1998 | Scheinkman et al. | |
| 5,875,296 A | 2/1999 | Shi et al. | |
| 5,877,759 A | 3/1999 | Bauer | |

(Continued)

FOREIGN PATENT DOCUMENTS

WO    WO 00/25239    5/2000

(Continued)

OTHER PUBLICATIONS

Teilhet, Stephen, "Sublcassing and Hooking with Visual Basic" Jun. 2001 http://www.oreilly.com/catalog/subhookvb/chapter/ch01.html.*

(Continued)

*Primary Examiner*—Steven B Theriault
(74) *Attorney, Agent, or Firm*—Greenberg Traurig, LLP; James J. DeCarlo

(57) ABSTRACT

An embodiment of the invention provides for one or more miniature-browser buttons, used with a downloadable toolbar for an Internet browser. The method may comprise sending downloadable toolbar characteristics from a predetermined Internet site, which includes miniature-browser button characteristics, creating a miniature-browser button in the downloadable toolbar and loading the miniature-browser button using the miniature-browser button characteristics.

58 Claims, 10 Drawing Sheets

U.S. PATENT DOCUMENTS

| | | |
|---|---|---|
| 5,883,810 A | 3/1999 | Franklin et al. |
| 5,890,172 A | 3/1999 | Borman et al. |
| 5,914,714 A | 6/1999 | Brown |
| 5,917,491 A | 6/1999 | Bauersfeld |
| 5,933,142 A | 8/1999 | LaStrange et al. |
| 5,949,419 A | 9/1999 | Domine et al. |
| 5,963,952 A | 10/1999 | Smith |
| 5,964,836 A | 10/1999 | Rowe |
| 5,974,446 A | 10/1999 | Sonnenreich et al. |
| 5,999,179 A | 12/1999 | Kekic et al. |
| 5,999,972 A | 12/1999 | Gish |
| 5,999,973 A | 12/1999 | Glitho et al. |
| 6,000,832 A | 12/1999 | Franklin et al. |
| 6,006,034 A | 12/1999 | Heath et al. |
| 6,009,459 A | 12/1999 | Belfiore et al. |
| 6,020,884 A | 2/2000 | MacNaughton et al. |
| 6,025,836 A | 2/2000 | McBride |
| 6,026,435 A | 2/2000 | Enomoto et al. |
| 6,034,683 A | 3/2000 | Mansour et al. |
| 6,041,360 A | 3/2000 | Himmel et al. |
| 6,057,836 A | 5/2000 | Kavalam et al. |
| 6,061,695 A | 5/2000 | Slivka et al. |
| 6,072,486 A | 6/2000 | Sheldon et al. |
| 6,101,486 A | 8/2000 | Roberts et al. |
| 6,112,240 A | 8/2000 | Pogue et al. |
| 6,119,098 A | 9/2000 | Guyot et al. |
| 6,125,352 A | 9/2000 | Franklin et al. |
| 6,141,010 A | 10/2000 | Hoyle |
| 6,175,869 B1 | 1/2001 | Ahuja et al. |
| 6,185,600 B1 | 2/2001 | Spence et al. |
| 6,188,995 B1 | 2/2001 | Garst et al. |
| 6,208,995 B1 | 3/2001 | Himmel et al. |
| 6,216,153 B1 | 4/2001 | Vortriede |
| 6,226,655 B1 | 5/2001 | Borman et al. |
| 6,226,752 B1 | 5/2001 | Gupta et al. |
| 6,232,972 B1 | 5/2001 | Arcuri et al. |
| 6,256,668 B1 | 7/2001 | Slivka et al. |
| 6,262,731 B1 | 7/2001 | Hasegawa |
| 6,266,058 B1 | 7/2001 | Meyer |
| 6,282,548 B1 | 8/2001 | Burner et al. |
| 6,286,001 B1 | 9/2001 | Walker et al. |
| 6,292,185 B1 | 9/2001 | Ko et al. |
| 6,297,819 B1 * | 10/2001 | Furst ........................ 715/733 |
| 6,314,451 B1 | 11/2001 | Landsman et al. |
| 6,360,255 B1 | 3/2002 | McCormack et al. |
| 6,373,507 B1 | 4/2002 | Camara et al. |
| 6,385,619 B1 | 5/2002 | Eichstaedt et al. |
| 6,407,754 B1 | 6/2002 | Hetherington et al. |
| 6,433,800 B1 | 8/2002 | Holtz |
| 6,434,563 B1 | 8/2002 | Pasquali et al. |
| 6,460,058 B2 | 10/2002 | Kopolu et al. |
| 6,469,713 B2 | 10/2002 | Hetherington et al. |
| 6,476,833 B1 | 11/2002 | Moshfeghi |
| 6,483,525 B1 | 11/2002 | Tange |
| 6,486,892 B1 | 11/2002 | Stern |
| 6,490,602 B1 | 12/2002 | Kraemer |
| 6,493,000 B1 | 12/2002 | Wynn et al. |
| 6,496,203 B1 | 12/2002 | Beaumont et al. |
| 6,496,936 B1 | 12/2002 | French et al. |
| 6,505,238 B1 | 1/2003 | Tran |
| 6,542,897 B2 | 4/2003 | Lee |
| 6,549,217 B1 | 4/2003 | De Greef et al. |
| 6,584,505 B1 | 6/2003 | Howard et al. |
| 6,624,831 B1 | 9/2003 | Shahine et al. |
| 6,651,217 B1 | 11/2003 | Kennedy et al. |
| 6,686,938 B1 | 2/2004 | Jobs et al. |
| 6,704,031 B1 | 3/2004 | Kimball et al. |
| 6,748,367 B1 | 6/2004 | Lee |
| 6,760,746 B1 * | 7/2004 | Schneider ................. 709/203 |
| 6,765,592 B1 * | 7/2004 | Pletcher et al. .......... 715/760 |
| 6,784,900 B1 * | 8/2004 | Dobronsky et al. ........ 715/744 |
| 6,789,201 B2 | 9/2004 | Barton et al. |
| 6,801,224 B1 * | 10/2004 | Lewallen ................... 715/746 |
| 6,819,343 B1 * | 11/2004 | Sobeski et al. ............. 715/848 |
| 6,851,060 B1 | 2/2005 | Shrader |
| 6,865,680 B1 | 3/2005 | Wu et al. |
| 6,868,394 B1 | 3/2005 | Mele |
| 6,873,974 B1 | 3/2005 | Schutzer |
| 6,925,496 B1 * | 8/2005 | Ingram et al. ............... 709/224 |
| 6,948,135 B1 * | 9/2005 | Ruthfield et al. ........... 715/854 |
| 6,957,390 B2 * | 10/2005 | Tamir et al. ................ 715/744 |
| 2001/0001147 A1 | 5/2001 | Hutchsion et al. |
| 2001/0035885 A1 * | 11/2001 | Iron et al. ................... 345/855 |
| 2002/0018078 A1 | 2/2002 | Khan et al. |
| 2002/0052890 A1 * | 5/2002 | Ingram et al. ............. 707/500.1 |
| 2002/0057299 A1 * | 5/2002 | Oren et al. ................. 345/825 |
| 2002/0062342 A1 | 5/2002 | Sidles |
| 2002/0069365 A1 * | 6/2002 | Howard et al. ............. 713/201 |
| 2002/0070963 A1 * | 6/2002 | Odero et al. ................ 345/739 |
| 2002/0070969 A1 | 6/2002 | Barksdale et al. |
| 2002/0075326 A1 | 6/2002 | Allen |
| 2002/0077978 A1 | 6/2002 | O'Leary et al. |
| 2002/0078095 A1 | 6/2002 | Culham |
| 2002/0089549 A1 | 7/2002 | Munro et al. |
| 2002/0097277 A1 | 7/2002 | Pitroda |
| 2002/0109706 A1 * | 8/2002 | Lincke et al. ............... 345/700 |
| 2002/0149615 A1 | 10/2002 | Rajarajan et al. |
| 2002/0149618 A1 | 10/2002 | Estrada et al. |
| 2002/0154159 A1 | 10/2002 | Day et al. |
| 2002/0158912 A1 | 10/2002 | O'Rouke |
| 2002/0163544 A1 | 11/2002 | Baker et al. |
| 2002/0163545 A1 | 11/2002 | Hii |
| 2002/0174176 A1 * | 11/2002 | Pinto et al. ................. 709/203 |
| 2002/0186239 A1 | 12/2002 | Komuro |
| 2002/0186249 A1 | 12/2002 | Lu et al. |
| 2002/0186255 A1 | 12/2002 | Shafron et al. |
| 2002/0186256 A1 | 12/2002 | Hong |
| 2002/0186257 A1 * | 12/2002 | Cadiz et al. ................ 345/838 |
| 2003/0009768 A1 | 1/2003 | Moir |
| 2003/0011641 A1 | 1/2003 | Totman et al. |
| 2003/0028764 A1 | 2/2003 | Campbell |
| 2003/0067481 A1 | 4/2003 | Chedgey et al. |
| 2003/0080995 A1 | 5/2003 | Tenenbaum et al. |
| 2003/0085916 A1 | 5/2003 | Thiry et al. |
| 2003/0085927 A1 | 5/2003 | Muller |
| 2003/0112271 A1 | 6/2003 | Batalden et al. |
| 2003/0112280 A1 | 6/2003 | Driskell |
| 2003/0128233 A1 | 7/2003 | Kasriel |
| 2003/0131106 A1 | 7/2003 | Kasriel |
| 2003/0164862 A1 * | 9/2003 | Cadiz et al. ................ 345/838 |
| 2003/0174154 A1 * | 9/2003 | Yukie et al. ................ 345/700 |
| 2003/0184582 A1 * | 10/2003 | Cohen ....................... 345/736 |
| 2003/0202009 A1 | 10/2003 | Kasriel |
| 2004/0021686 A1 * | 2/2004 | Barberis .................... 345/738 |
| 2004/0041835 A1 * | 3/2004 | Lu .............................. 345/748 |
| 2004/0061720 A1 * | 4/2004 | Weber ........................ 345/760 |
| 2004/0125130 A1 | 7/2004 | Flamini et al. |
| 2004/0174396 A1 | 9/2004 | Jobs et al. |
| 2004/0186775 A1 | 9/2004 | Margiloff et al. |
| 2004/0212640 A1 * | 10/2004 | Mann et al. ................ 345/792 |
| 2004/0243520 A1 | 12/2004 | Bishop et al. |
| 2005/0010673 A1 * | 1/2005 | Satuloori et al. ........... 709/231 |
| 2005/0039141 A1 | 2/2005 | Burke et al. |
| 2005/0039144 A1 * | 2/2005 | Wada et al. ................ 715/840 |
| 2005/0071776 A1 * | 3/2005 | Mansfield et al. .......... 715/805 |
| 2005/0166136 A1 * | 7/2005 | Capps et al. ............. 715/500.1 |
| 2005/0251742 A1 * | 11/2005 | Mogilevsky et al. ........ 715/521 |
| 2005/0259120 A1 * | 11/2005 | Mansfield et al. .......... 345/661 |
| 2005/0278651 A1 * | 12/2005 | Coe et al. ................... 715/779 |
| 2007/0199063 A1 * | 8/2007 | Howard et al. .............. 726/12 |

FOREIGN PATENT DOCUMENTS

| | | |
|---|---|---|
| WO | WO 00/31657 A2 | 6/2000 |

| | | |
|---|---|---|
| WO | WO 01/39046 A1 | 5/2001 |
| WO | WO 01/67285 A2 | 9/2001 |
| WO | WO 01/95104 | 12/2001 |
| WO | WO 03/038554 | 5/2003 |
| WO | WO 03/038640 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

"Band Objects", Microsoft Corporation, Copyright 1997.
"Browser Extensions", MSDN, Copyright 2004, http://msdn.microsoft.com/library/default.asp?url=/workshop/browser/ext/overview/overview.asp.
"Creating Custom Explorer Bars, Tool Bands, and Desk Bands", MSDN, Copyright 2004, http://msdn.microsoft.com/library/default.asp?url=/library/en-us/shellcc/platform/Shell/programmersguide/shell_adv/bands.asp.
"Developers Get Early IE 5", Wired News, Jun. 11, 1998, http://www.wired.com/news/print/0,1294,12936,00.html.
"Introduction", XUL Programmer's Reference Manual, Last Updated: Apr. 5, 2001, http://www.mozilla.org/xpfe/xulref/.
"Netscape 6 Preview Release 1", NT Compatible, Apr. 5, 2000, http://www.ntcompatible.com/story322.html.
"Plug-in Guide", DevEdge Online Documentation, Jan. 1998, Chapter 1, http://developer.netscape.com/docs/manuals/communicator/plugin/index.htm.
"Subject: Add toolbar to IE4-taskbar", Google Groups, Jan. 26, 1999, http://groups.google.com/groups?hl=en&lr=&ie=UTF-8&oe=UTF-8&threadm=36ae2a57.3471779%40news.uni-stuttgart.de&rnum=9&prev=/groups%3Fhl%3Den%26lr%3D%26ie%3DUTF-8%26oe%3DUTF-8%26q%3Dtoolbar%2Bin%2Bie4.
"Subject: Adding Toolbar (Plugin) in Netscape Communicator", Google Groups, May 18, 2000, http://groups.google.com/groups?hl=en&lr=&ie=UTF-8&oe=UTF-8&threadm=8gp8t5%241ab1%40secnews.netscape.com&rnum=23&prev=/groups%3Fq%3Dcustom%2Btoolbars%2Bin%2Bnetscape%2B6%26start%3D20%26hl%3Den%26ir%3D%26ie%3DUTF-8%26oe%DUTF-8%26selm%3D8gp8t5%25241ab1%2540secnews.netscape.com%26rnum%3D23.
"Subject: Custom Toolbar for Netscape Browser", Google Groups, May 15, 2001, http://groups.google.com/groups?hl=en&lr=&ie=UTF-8&oe=UTF-8&threadm=3B0177FD.BE89042B%40univ.ox.ac.uk&rnum=2&prev=/groups%3Fhl%3Den%26lr%3D%26ie%3DUTF-8%26oe%3DUTF-8%26q%3Dcustom%2Bnetscape%2B6%2Btoolbar%2B-button%2B-personal.
"Subject: How the Hell????", Google Groups, Jun. 6, 2000, http://groups.google.com/groups?hl=en&lr=&ie=UTF-8&oe=UTF-8&threadm=8hln7u%24fb53%40secnews.netscape.com&rnum=11&prev=/groups%3Fq%3Dadding%2Btoolbars%2Bin%2Bnetscape%2B-6%26start%3D10%26hl%3Den%26lr%3D%26ie%3DUTF-8%26oe%3DUTF-8%26selm%3D8hln7u%2524fb53%2540secnews.netscape.com%26rnum%3D11.
"Subject: How to add toolbar like Yahoo companion in IE", Google Groups, Sep. 30, 1999, Messages 1-10, http://groups.google.com/groups?hl=en&lr=&ie=UTF-8&oe=UTF-8&threadm=OWlmH%246C%24GA.227%40cppssbbsa02.microsoft.com&rnum=88&prev=/groups%3Fq%3Dtoolbar%2Bin%2Bie4%26hl%3Den%26lr%3-D%26ie%3DUTF-8%26oe%3DUTF-8%26start%3D80%26sa%3DN.
"Subject: How to add toolbar like Yahoo companion in IE", Google Groups, Sep. 30, 1999, Messages 11-14, http://groups.google.com/groups?hl=en&lr=&ie=UTF-8&oe=UTF-8&threadm=7tdbfa%247j9%241%40nnrp1.deja.com&rnum=2%prev=/groups%3Fhl%3Den%26ie%3DUTF-8%26oe%3DUTF-8%26q%3Dtool%2Bband%2Bin%2Bie4%26spell%3D1.
"Subject: IE4 Band Objects", Google Groups, Mar. 22, 1998, http://groups.google.com/groups?hl=en&lr=&ie=UTF-8&oe=UTF-8&threadm=3524f417.0%40news1.cityweb.de&rnum=1&prev=/groups%3Fhl%3Den%26lr%3D%26ie%3DUTF-8%26oe%3DUTF-8%26q%3D%2522communication%2Bbands%2522%2Bie4.
"Subject: Plugins for IE", Google Groups, Sep. 30, 2000, http://groups.google.com/groups?hl=en&lr=&ie=UTF-8&oe=UTF-8&threadm=Ojkp2jxLAHA.243%40cppssbbsa04&rnum=24&prev=/groups%3Fq%3Dplugin%2Bgroup:micro0soft.public.inetexplorer.ie4.activex_contri%26hl%3Den%26lr%3D%26ie%3DUTF-8%26oe%3DUTF-8%26group%3Dmicrosoft.public.inetexplorer.ie4.activex_contri%26start%3D20%26sa%3DN.
"Subject: Toolbar like IE4", Google Groups, Apr. 23, 1998, http://groups.google.com/groups?hl=en&lr=&ie=UTF-8&oe=UTF-8&threadm=eyzHG4qb9GA.136%40uppssnewspub05.moswest.msn.net&rnum=6&prev=/groups%3Fhl%3Den%26lr%3D%26ie%3DUTF-8%26oe%3DUTF-8%26q%3Dtoolbar%2Bin%2Bie4.
"Subject: Whats the deal with Yahoo Companion? Standard plugin API or not?", Google Groups, Jan. 12, 2000, http://groups.google.com/groups?hl=en&ir=&ie=UTF-8&oe=UTF-8&threadm=387D225C.E3796E7C%40sympatico.ca&rnum=2&prev=/groups%3Fhl%3Den%26lr%3D%26ie%3DUTF-8%26oe%3DUTF-8%26q%3Dcustom%2Btoolbar%26btnG%3DGoogle%2BSearch-%26meta%3Dgroup%253Dnetscape.devs-plugins.
Berst, Jesse, "A Must-See Browser Add-On," ZDNet AncorDesk. Sep. 16, 1998. http://www.zdnet.com/anchordesk/story/story_2543.html.
Lash, Alex, "Alexa Accessorizes Browsers," CNET News.com. Sep. 22, 1997. http://news.com.com/2100-1001-203484.html.
Eisenberg, Bart, "Alexa Archives the Internet," Copyright 1997. http://www.gihyo.co.jp/magazine/SD/pacific/SD_9711.html.
"As Go Surfers, So Goes Alexa". Wired News. Jul. 24, 1997. http://www.wired.com/news/technology/0,1282,5427,00.html.
"Client/Server and Host Application Development Tools", DBMS, v9, n6, p. 27(10), Jun. 15, 1996.
Alexa Internet Website. Archived Feb. 9, 1998 at http://web.archive.org.
Alwang, Greg, "Meeting of the Minds", PC Magazine, v17, n4, p. 179(10), Feb. 24, 1998.
Childers, Mark, "Delphi Client/Server Suite", PC Magazine, v15, n1, p. 207(3), Sep. 10, 1996.
Evans, Nick, "Extend Client/Server Apps to the Web", Data Based Advisor, v15, n3, p. 52(5), Mar. 1997.
Faison, "The New HTML Help System Extends Online From the Desktop to the Web", Microsoft Systems Journal, v13, n1, p. 55(14), Jan. 1998.
Finn, Mike, "Add Control to your Intranet", Databased Web Advisor, v15, n8, p. 56(3), Aug. 1997.
Flanagan, David, "Netscape 6.0 Released", O'Reilly, Nov. 16, 2000, http://www.oreillynet.com/pub/a/oreilly/news/flanagan3_1100.html.
Galli, Marcio, "The DevEdge RSS-News Ticker Toolbar", Netscape DevEdge, Jul. 14, 2003, http://devedge.netscape.com/viewsource/2003/rss-toolbar-ticker/.
International Preliminary Examination Report for International Application No. PCT/US01/16993, Mar. 5, 2003.
International Preliminary Examination Report for International Application No. PCT/US99/25332, Jul. 29, 2002.
International Search Report for International Application No. PCT/US01/16993, Oct. 25, 2001.
International Search Report for International Application No. PCT/US02/34509, Oct. 28, 2003.
International Search Report for International Application No. PCT/US02/34510, Jan. 31, 2003.
International Search Report for International Application No. PCT/US99/25332, Feb. 2, 2000.

Written Opinion for International Application No. PCT/US02/34510, Sep. 26, 2003.

Jimmy, "Netscape 6.0 Preview Release 2 Review—Good Software, Bad Timing", Jimmy's World, Aug. 9, 2000, http://www.jimmysworld.org/opinions/netscape-6.0-pr2.html.

Mace, Thomas, "PowerBrowser", PC Magazine, vol. 15, No. 5, p. 132(1), Mar. 12, 1996.

Mann, Alex and Hecht Kevin, "DevEdge Newsgroup FAQ: Client Technical", DevEdge Online Archive, Last Updated: Dec. 15, 1998, http://developer.netscape.com/support/faqs/champions/client_tech.html.

Mendelson, Edward, "Wake Up Your Web Site", PC Magazine, vol. 17, No. 11, p. 60(2), Jun. 9, 1998.

Persky, James, "HTML goes WYSIWYG: Two Mac-based Editors", LAN Magazine, v12, n3, p. 121(5), Mar. 1997.

Roberts, Scott, "Programming Microsoft Internet Explorer 5", Jul. 1999, pp. 3-16, 383-423, 461-475, Microsoft Press, USA.

Summers, Jason, "Plug-ins Newsgroup FAQ: Plug-ins", DevEdge Online Archive, Last Updated: May 26, 1999, http://developer.netscape.com/support/faqs/plugins/general.html.

Trupin, Joshua, "The Visual Programmer puts Active X Document Objects Through Their Paces", Microsoft Systems Journal, v11, n6, p. 55(16), Jun. 1996.

Ladd, Eric and O'Donnell, Jim, "Using Microsoft Internet Explorer 4," Que Corporation. 1997. pp. 42 and 43.

Walter, Mark, "Acrobat 4: Adobe's Bid to Make it More than Just a Viewer", Seybold Report on Internet Publishing, 3, 7, NA(1), Mar. 1999.

Wong, William, "Meeting on the Internet in 10 Minutes", Network, v12, n12, p. 131(4), Nov. 1997.

Alexa, Alexa Toolbar Version 1.4.1, Copyright 1998, Note: Setup File Available on Enclosed CD in Folder Entitled "Alexa Setup," also available at http://ftp3.ru.freebsd.org/pub/pc/windows/WinSock/IE/ at hyperlink alexaSetup14m.exe.

International Preliminary Examination Report for International Application No. PCT/US02/34509; May 11, 2004.

International Preliminary Examination Report for International Application No. PCT/US02/34510; Aug. 12, 2004.

International Search Report for International Application No. PCT/US04/24397; Oct. 31, 2005.

Written Opinion for International Application No. PCT/US04/24397; Oct. 31, 2005.

International Preliminary Examination Report for International Application No. PCT/US2004/024397; Feb. 13, 2006.

Hauser, "Generic Extensions of WWW Browsers", First USENIX Workshop on Electronic Commerce; Aug. 10, 1995; pp. 147-154.

* cited by examiner

200

240

200'

METHOD AND SYSTEM OF PROVIDING BROWSER FUNCTIONALITY THROUGH A BROWSER BUTTON

CROSS-REFERENCE TO RELATED APPLICATION

This application claims the benefit of U.S. Provisional Application Ser. No. 60/516,196, filed Oct. 31, 2003, entitled METHOD AND SYSTEM OF PROVIDING BROWSER FUCTIONALITY THROUGH A BROWSER BUTTON, which is hereby incorporated herein by reference.

BACKGROUND OF THE INVENTION

1. Field of the Invention

The invention is directed to computer interfaces and, more particularly, to a method and system of providing browser functionality through a button or toolbar of a browser.

2. Description of Related Art

When accessing the Internet and the World Wide Web, an Internet user typically executes, via a computer, a browser software program such as, for example, Netscape Navigator™ or Microsoft™ Internet Explorer™. The browser program (i.e., a browser) establishes a link to the Internet (via a modem and an Internet Service Provider (ISP), for example) and also provides a textual and graphical user interface (for example, an application window), and included in the application window, a window for displaying Internet content (for example, a browser window) and toolbars for interfacing with the browser.

The toolbars assist a user in interfacing with the browser. Toolbars can include textual regions, graphical regions, or a combination of both textual and graphical regions. Selecting an item on a toolbar by, for example, a mouse click, can instruct the browser to perform a certain function, or such selection may open a menu of items from which a user can choose from a plurality of items. Other browser toolbars allow a user to enter an Internet address and instruct the browser to navigate to that address. Some of the browser functions that can be implemented include, for example, save, forward, back, stop and refresh.

A deficiency with present browser systems, however, is that the toolbars and their buttons are typically static in their look and functionality. Accordingly, a need exists for an improved method and system for toolbars and toolbar buttons with added functionality and richer content. In addition, although present browser systems allow users to make modifications to the toolbar settings, a deficiency with present browser systems is that the settings are limited to the computer where the modifications were implemented, and once set, are the same for each user who uses a computer. Accordingly, a need exists for an improved method and system for providing customizable buttons for a browser.

SUMMARY OF THE INVENTION

The invention as claimed herein satisfies this and other needs, which will be apparent from the teachings herein. As mentioned above toolbar buttons and drop down menus are typically static in nature, including an image and/or text. In contrast, in accordance with an embodiment of the invention, dynamic content, which is displayable in a browser window, is created using any of the available tools used to create dynamic and rich Web content, such as, for example Java, Javascript, flash, HTML, XML, etc. An appropriately sized browser window is displayed on a toolbar's buttons, menus, and/or menu items or may occupy a space where no button or interface element existed previously. The dynamic content is loaded into the browser window for display. Thus, the buttons, menus, and/or menu items or other elements of the browser user interface display dynamic content as opposed to only displaying static images and/or text. As used herein, the term miniature-browser button refers to a button or other toolbar or user interface element that can display content displayable by a browser.

An embodiment of the invention includes one or more miniature-browsers buttons, used with a downloadable toolbar for an Internet browser. The method may comprise receiving downloadable toolbar characteristics, which include miniature-browser button characteristics, from a predetermined Internet site. Embodiments of the invention can also include creating a miniature-browser button in the downloadable toolbar and loading the miniature-browser button using the miniature-browser button characteristics.

Other objects and features of the invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method of providing miniature-browser buttons.

Figure 1:
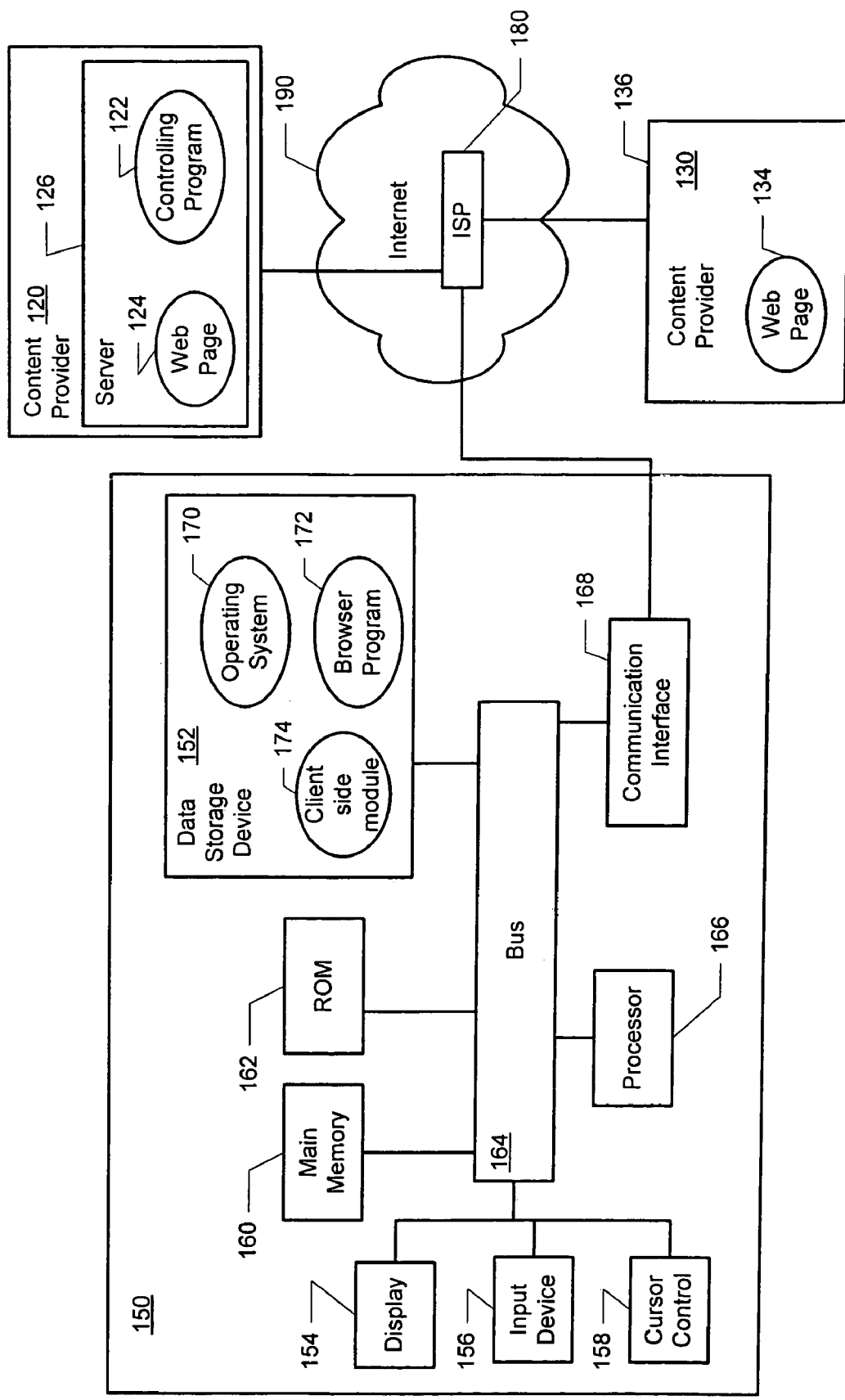
FIG. 1 is a schematic illustrating an exemplary system implemented according to an embodiment of the invention.

With reference to FIG. 1, there is shown an exemplary block diagram of a system 100 implemented in accordance with certain embodiments of the invention. A computer 150 is connected to the Internet 190. While the Internet 190 is used in the exemplary embodiment of FIG. 1, the invention may also be used over any network of computers including local internets, intranets, local area networks (LANs), wide area networks (WANs), etc. Computer 150 includes an internal bus 164 that facilitates communication of information (i.e., digital data) between and among the various devices of the computer 150 and that also facilitates communication between the computer 150 and external devices and systems via a communication interface 168. A processor 166 coupled to the bus 164 processes information within the computer 150. The computer 150 also includes a memory 160 such as, for example, Random Access Memory (RAM) and/or other dynamic memory storage devices, coupled to bus 164 for receiving and storing instructions communicated from the processor 166. Memory 160 may also be used to temporarily store variable or other intermediate information while the processor 166 executes instructions. Read-Only-Memory (ROM) 162 is also coupled to the bus 164 for storing static data and instructions for use by the processor 166.

Various input and output devices are provided as part of computer 150, including, by way of non-limiting example, a display 154 (for example, cathode ray tube (CRT), liquid crystal display (LCD), etc.), an input device 156 such as a keyboard, and a cursor control device 158 such as a mouse, or trackball, for example. A data storage device 152 such as, for example, a magnetic disk drive and magnetic disk, a CD-ROM drive and CD-ROM, or other equivalent devices and data storage mediums, is coupled to the bus 164 for communication with the processor 166, main memory 160, and communication interface 168. The storage device 152 preferably has an operating system 170 and an Internet browser software program 172 (i.e., a browser) stored thereon. As will be discussed in greater detail below, a client-side module 174 may also be stored on the data storage device 152.

The computer 150 may communicatively connect to the Internet 190 via the communication interface 168 over one or more transmission media including, but not limited to, coaxial cable, copper wires, and fiber optical cables. Communication between the computer 150 and the Internet 190 may also be via a wireless medium, such as, for example, a cellular interface. The communication interface 168 facilitates two-way communication between the computer 150 and another electronic device or system, for example, a server computer or computers 126 provided by a content provider 120, 130.

An Internet user (not shown) using the computer 150 may gain access to the Internet 190 by causing the browser 172 to execute, thereby opening a communication link between the communication interface 168 of the computer 150 and an Internet site 126 of content provider 120, via an Internet Service Provider (ISP) 180. Internet content is communicated by the content provider 120 to the computer 150 for display by browser 172. Alternatively, a content provider 120, 130 may also be an ISP 180.

In alternative embodiments, computer 150 may be a desktop or notebook computer, personal digital assistant (PDA), hand held device, or wireless phone (with graphics capability), or any other device now known or hereafter developed that is capable of performing the functions as described herein.

In accordance with an embodiment of the invention, a first Internet content provider 120 may provide an Internet user with access to a program 122 for controlling the browser 172. When executed by the user, the controlling program 122 downloads or creates a client-side module 174 such as, for example, a Dynamic Link Library (DLL), on the data storage device 152 of the Internet user's computer 150. The client-side module 174 preferably includes ActiveX control and/or Plug-in functionality. Thereafter, when the Internet user accesses the Internet using the browser 172, the browser 172 opens the client-side module 174 and preferably automatically establishes a connection to the content provider's Internet site 126. The content provider, in response to the connection established by the browser 172, loads information and/or functional data into a shell operating within the browser and created by the client-side module 174. For example, if the user has an account with the content provider 120, customized information and/or functionality may be loaded into the client-side module 174. If the user does not have an account, more generalized (for example, guest) information and/or functionality may be loaded. In an embodiment, information sent to the computer 150 is sent through a button feed from the content provider 120, as is described in further detail below.

The client-side module 174 opens a shell (or a plurality of shells) within the browser 172 that contains the ActiveX control or Plug-in code that may control, i.e., add to, remove from, and/or modify, the Internet browser 172. When loaded with the ActiveX control or Plug-in, the client-side module 174 preferably contains functions, objects, data, and other software, referred to generally herein as information, that may be used to control the browser 172. The client-side module 174 (and shell) can be persistent and thus, does not close when the Internet user moves, for example, from Internet site 126 (having a Web page 124) to Internet site 136 (having Web page 134). Thus, the information and/or functionality provided via the ActiveX control or Plug-in is not lost when the Internet user disconnects from the Internet site that loaded the ActiveX control or Plug-in, and connects to another Internet site. In alternate embodiments client-side module 174 may be located at a remote location from the Internet user.

An embodiment may be provided as a feature of a method of controlling an Internet browser interface displayable by an Internet browser on a display of a computer, and enabling a user of the computer and Internet browser to access and navigate the Internet and to receive and display on the computer one or more Web pages from one or more Internet sites, including the display of a Web page from a predetermined Internet site, the Internet browser having at least one Internet browser toolbar having at least one toolbar button providing a predetermined functionality to the user of the computer and Internet browser. The method can comprise providing, at the predetermined Internet site, access to a program for controlling the Internet browser interface and making available for downloading by the predetermined Internet site, a file for causing the display of a persistent user toolbar adjacent to the Internet browser toolbar so as to create the visual impression that the user toolbar is an integrated part of the Internet browser, the user toolbar making additional functionality that is not part of the Internet browser prior to download available to the user after download as part of the Internet browser interface. Once the user toolbar is displayed the user toolbar remains displayed and the additional functionality remains available to the user regardless of a subsequent Internet site to which the Internet browser is caused to navigate after download. Such a method is described in further detail in U.S. patent application Ser. No. 09/429,585, filed Oct. 28, 1999, and entitled "A Method Of Controlling An Internet Browser Interface And A Controllable Browser Interface," the contents of which are hereby incorporated by reference herein.

A method of providing miniature-browser buttons may be implemented using, by way of non-limiting example, a client-side module 174 operating as a downloadable browser toolbar. An Internet user may customize the downloadable toolbar so that each time the user accesses the Internet using a browser, user-defined information and/or functionality will be displayed with the browser interface. The toolbar may include bookmarks, address and phone books, personal financial information, personalized news, and/or various functionality such as is available via ActiveX control and Plug-ins. When the toolbar is executed, the client-side module 174 can receive some, none or all of the toolbar buttons from a content provider 120. The toolbar buttons and their characteristics may be obtained through a feed from the content provider 120 to the client computer 150.

In addition, if an Internet user has an account with a content provider 120, that user's specific account information (for example, investment portfolio, news headlines, bookmarks, address book, customized button, etc.) may be saved by the content provider 120 and dynamically displayed by different browsers on different computers. Also, two or more Internet users who share the same computer, but have different user accounts with a content provider 120 can each load their own account information, for example, pre-defined personal buttons, so that each user's personal buttons are displayed when that user logs into his or her respective account.

Downloadable browser toolbar buttons, menus and menu items are typically implemented using toolbar button drawing styles including a static icon/image and/or text. In embodiments of the invention, however, miniature-browser or mini-browser buttons are buttons on a toolbar which use a small Web browser control to display its interface. For a miniature-browser button, the outline of the button is drawn in a typical fashion, as is known in the art, but some or all of the content of the button is displayed using Web browser control(s). Therefore, dynamic and rich content that can be created for a Web page is made displayable in a button, menu and/or menu items as opposed to just displaying an image and/or text. The dynamic content may be created using HTML, DHTML, Flash, animated GIFs, Java, etc.

Figure 2:
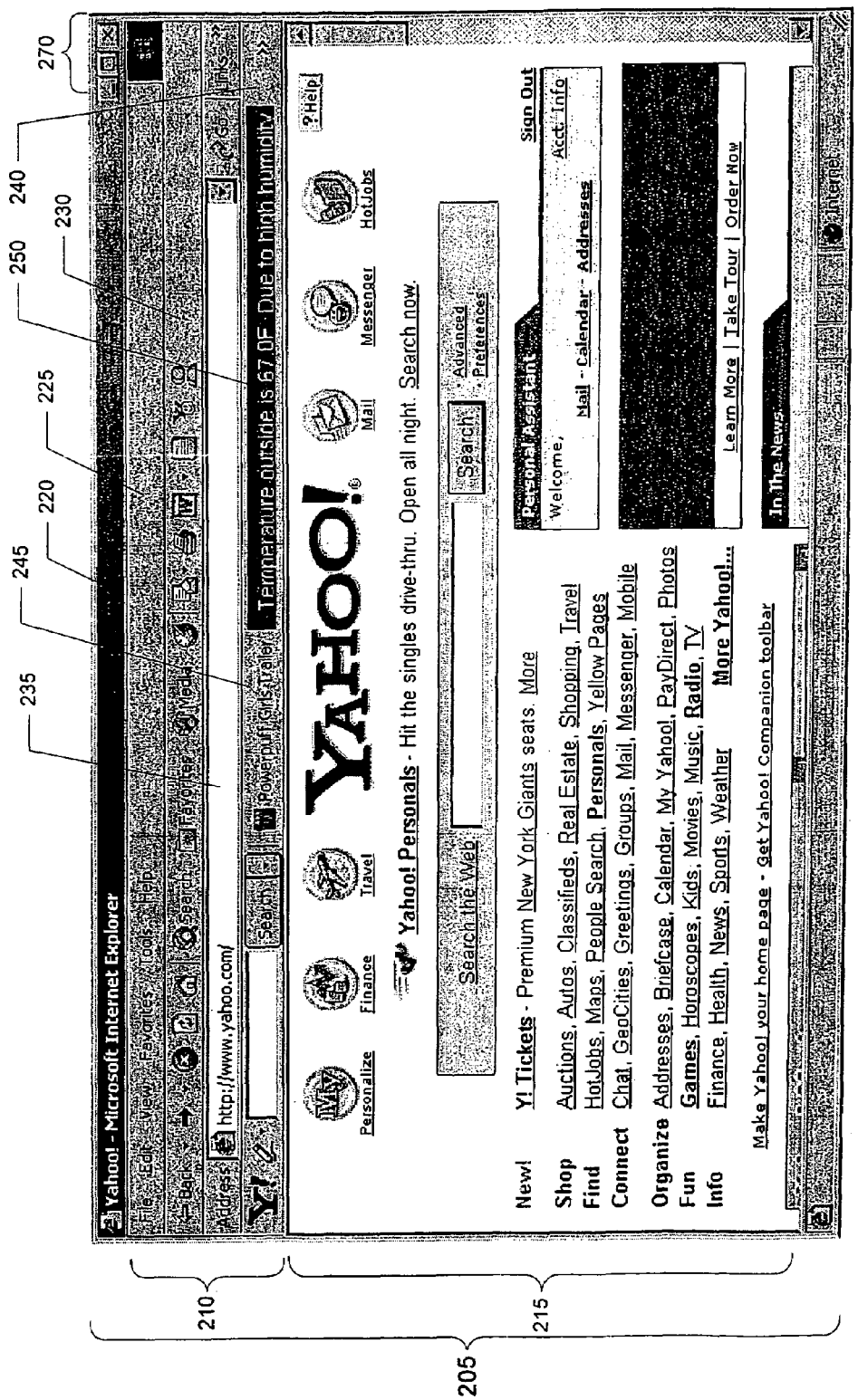
FIG. 2 is an exemplary screen shot illustrating a browser implemented according to an embodiment of the invention.

FIG. 2 is an exemplary screen shot illustrating a browser 200 implemented according to an embodiment of the invention. Browser 200 includes a plurality of windows that provide various functionalities to an Internet user. The browser 200 may comprise a first application window 205 that typically defines the general size, color, and layout of the browser 200 and includes window control buttons 270 (for example, minimize, close, etc.) for that application window 205. The browser 200 may also comprise a browser window 215 and toolbar windows 210. The browser window 215 and the toolbar windows 210 typically define information and/or functionality that will assist an Internet user when accessing and navigating the Internet. For example, the browser window 215 and the toolbar windows 210 may provide toolbars, pull-down menus, Plug-ins, applications, etc. A browser window 215 is provided as part of the browser 200 within which content from an Internet content provider 120 (see FIG. 1) may be displayed.

Toolbar windows 210 provided at the top (see FIG. 2) of the application window 205 define four toolbars 225, 230, 235, 240, which may include a variety of interface controls such as, for example, pull-down menus, functional buttons (for example, stop, back, forward, home, etc.), and a combination of functional buttons and windows (for example, a search button and window). The upper most toolbar 225, also known as a menu bar, provides a plurality of pull-down menus; the second toolbar from the top 230 provides a plurality of functional buttons; the third toolbar from the top 235 provides a pull-down menu and a window, for example, a Universal Resource Identifier (URI) address window; the bottom most toolbar 240 is executed by the client-side module 174 and provides added functionality to the browser separate from that provided by the browser prior to download of the client-side module 174, such as a search field, a movie trailer button 245 and an information scroll button 250. Buttons 245 and 250 are implemented using miniature-browser buttons as described below.

Figure 3:
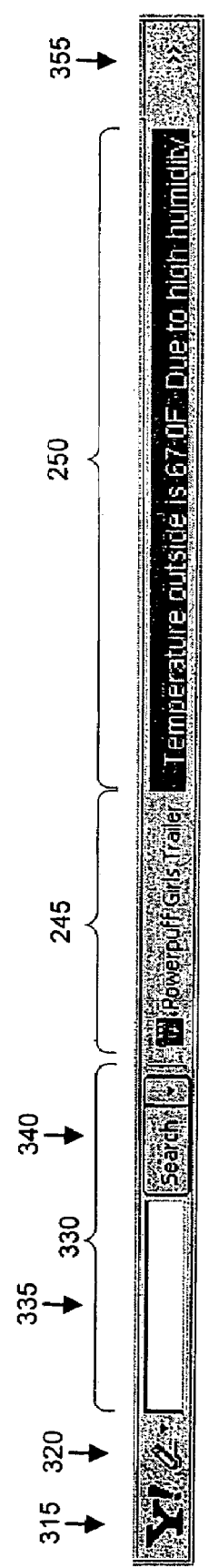
FIG. 3 is an exemplary screen shot illustrating a browser toolbar implemented according to an embodiment of the invention.

FIG. 3 is a screenshot illustrating an embodiment of the bottom most toolbar 240 implemented in accordance with the invention. Toolbar 240 can include one or more of a shortcut button to a content provider 315, such as, for example, a shortcut to Yahoo!, a toolbar settings button 320, a search region 330, which includes a search field 335 and a search button 340, a movie trailer button 245, an information scroll button 250 and a button 355 that creates a drop down menu including more toolbar items for an Internet user. These additional items may include a shortcut to e-mail and shopping functions (not shown). Movie trailer button 245 and a information scroll button 250 are exemplary miniature-browser buttons implemented in accordance with an embodiment of the invention.

Toolbar 240 can be implemented using one or more of three categories of buttons. The first category of button is called BUTTON. A BUTTON button performs an action when any part of the button is selected (for example, clicked on). Shortcut button 315 is an example of a BUTTON button. Clicking on any part of button 315 will navigate the browser 200 to a particular content provider's Web page. BUTTON buttons, such as button 315 can be implemented using typical methods, for example by displaying an image and/or text or as a miniature-browser button, where a browser window capable of displaying a variety of Internet content is used to display a button's content. An Internet provider can manipulate the URI assigned to the shortcut button through a button feed.

The second category of button is called MENU. When the user clicks anywhere on a MENU button, a menu including additional options is displayed. For example clicking on any part of toolbar settings button 320 causes a menu to appear below the button 320. The menu includes a list of additional options such as, for example, adding and/or editing toolbar buttons, changing the layout of the toolbar and refreshing the toolbar. Some menu items may open a second menu including more items. An Internet content provider can use a button feed to define the number of items that are in a menu. The main MENU button itself or any or all menu items may be implemented as miniature-browser buttons. For example, the main MENU button and the first two items on the menu can be implemented as a miniature-browser buttons, while the remaining items on the menu are implemented in a typical manner.

The third category of button is called BUTTONMENU. BUTTONMENU buttons include a clickable region of the button that performs an action, and a clickable region that displays a menu. Search button 340 is an example of a BUTTONMENU button. Selecting the "Search" portion of the button 340 initiates a search for the term entered in the search field 335, while selecting the arrow portion of the search button 340 causes a menu to appear below the button with additional options for the user. The main BUTTONMENU button and/or any or all menu items can be implemented as miniature-browser buttons. For example, one button can have the main region of the button implemented in a typical fashion, but a BUTTONMENU button can include a menu with two menu items, the first being implemented as a miniature-browser button and the second being implemented as a typical menu item.

Figure 4:
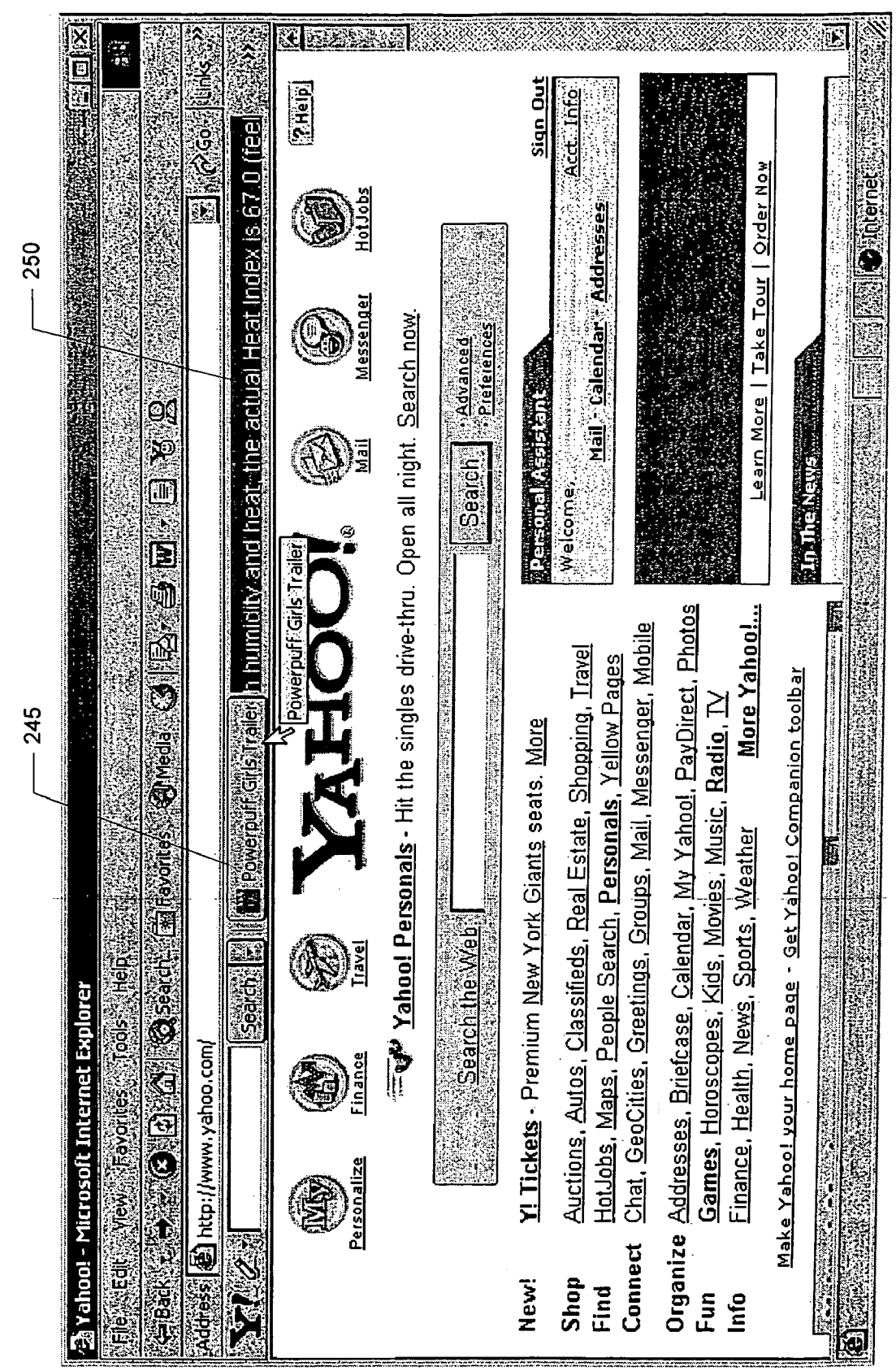
FIG. 4 is an exemplary screen shot illustrating a mouse pointer positioned over a miniature-browser button according to an embodiment of the invention.

Movie trailer button 245 and information scroll button 250 are two non-limiting examples of the functionality that can be added to a toolbar button. FIG. 4 illustrates the movie trailer button when a user positions a mouse cursor over the button. As with typical toolbar buttons, a border is formed around the button 245 to indicate to the user which button on the toolbar will activate upon selection.

Figure 5:
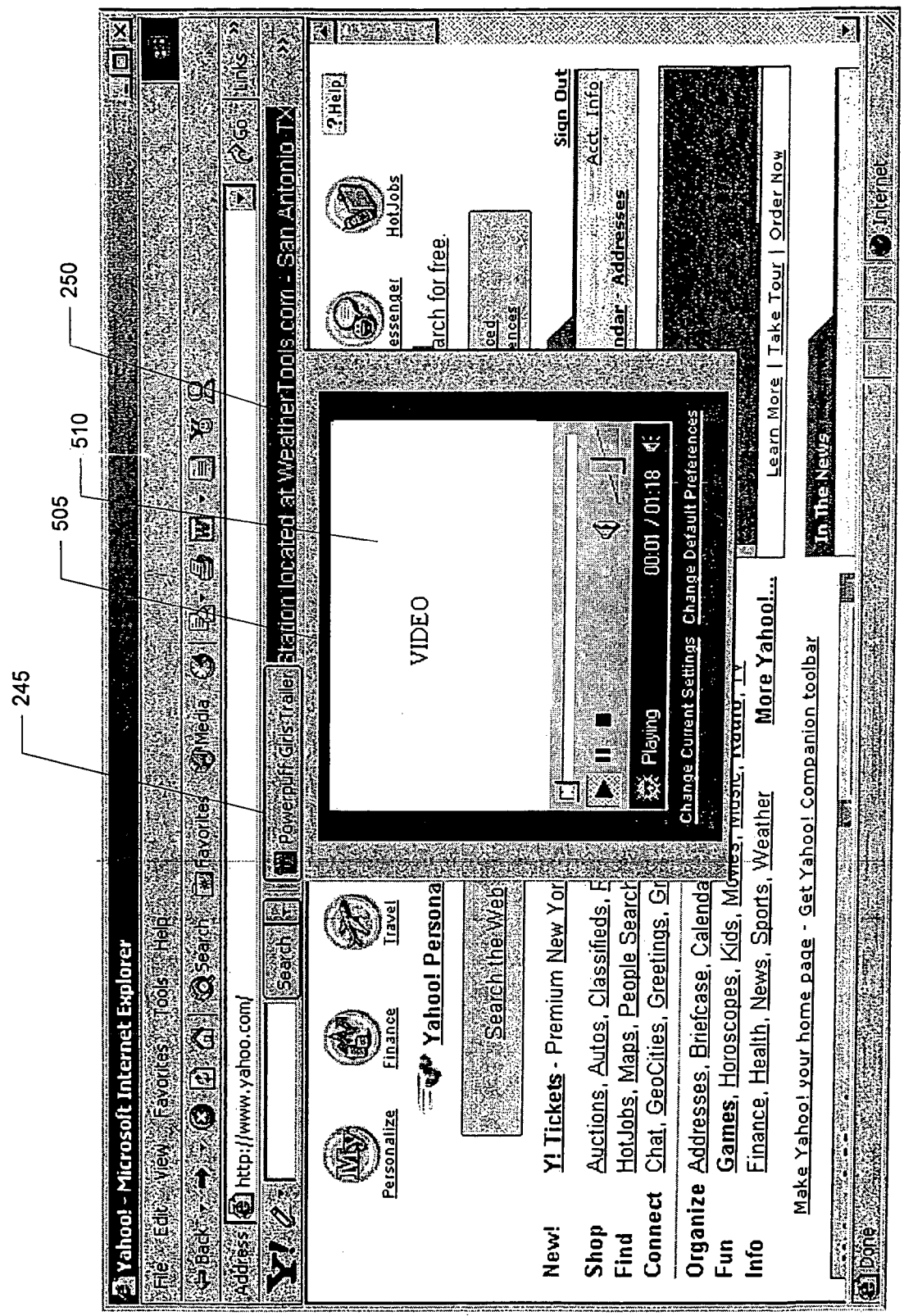
FIG. 5 is an exemplary screen shot illustrating a video display feature of a miniature-browser button according to an embodiment of the invention.
Figure 6:
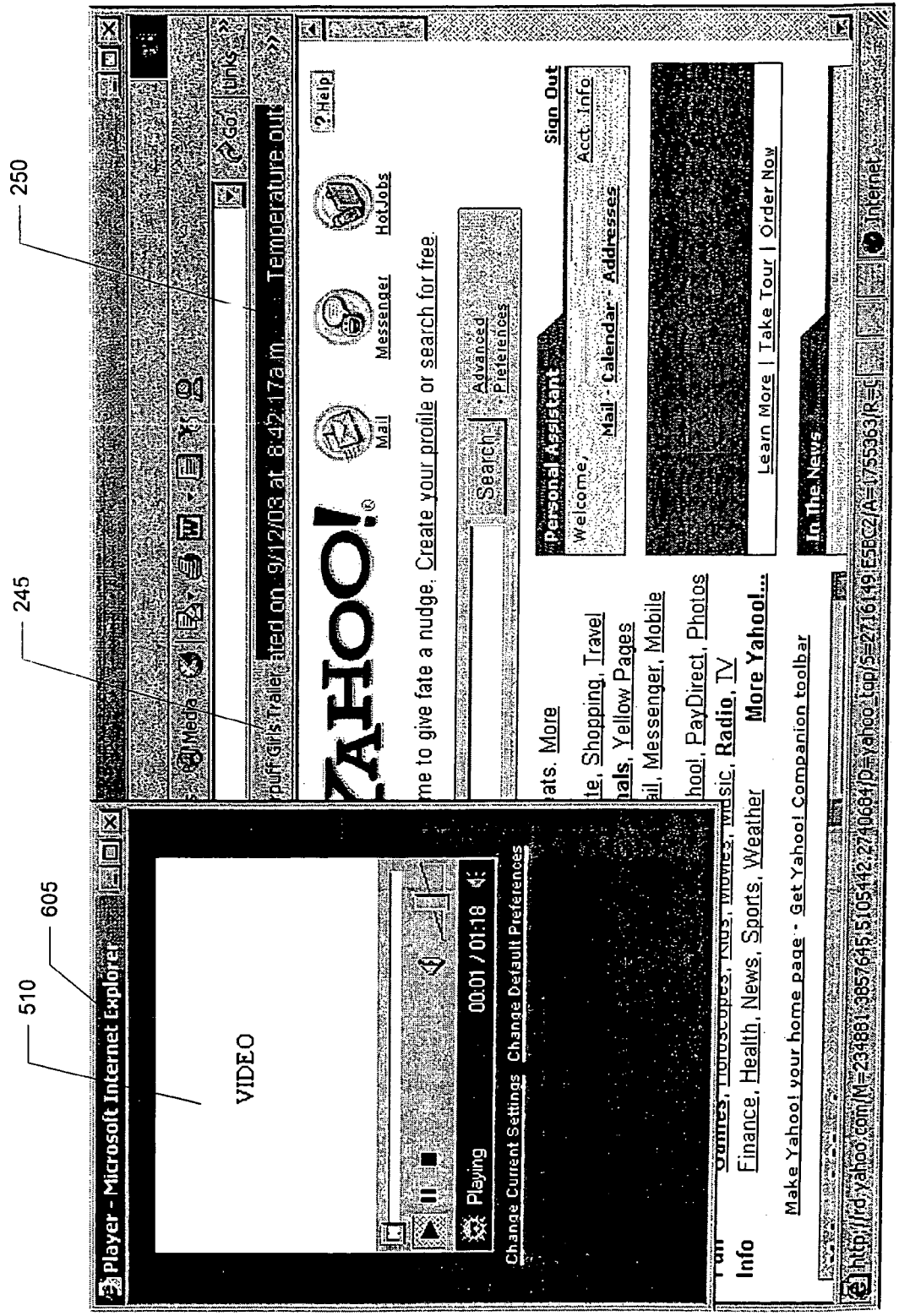
FIG. 6 is an exemplary screen shot illustrating another video display feature of miniature-browser buttons according to an embodiment of the invention.

Movie trailer button 245 is a MENU button. As illustrated in FIG. 5, when a user selects button 245, a menu 505 including a video player 510 is displayed under the button. The video may be a streaming video offered by any Internet content provider and can be played using a plug-in such as, for example, Windows Media™ Player. In addition, as illustrated in FIG. 6, selecting (for example, clicking) menu 505 creates a second browser window 605, which includes the video player 510. In alternate embodiments, a second browser window may be created by clicking on the video player 510 or by selecting a menu item, included in addition to the video player 510, for creating a second browser window. While previous menu items included static icons and/or text, the invention allows for the implementation of a menu item that displays video. Additional functionality may be added to the menu using different browser related applications such as, for example, applets and/or scripts.

Figure 7:
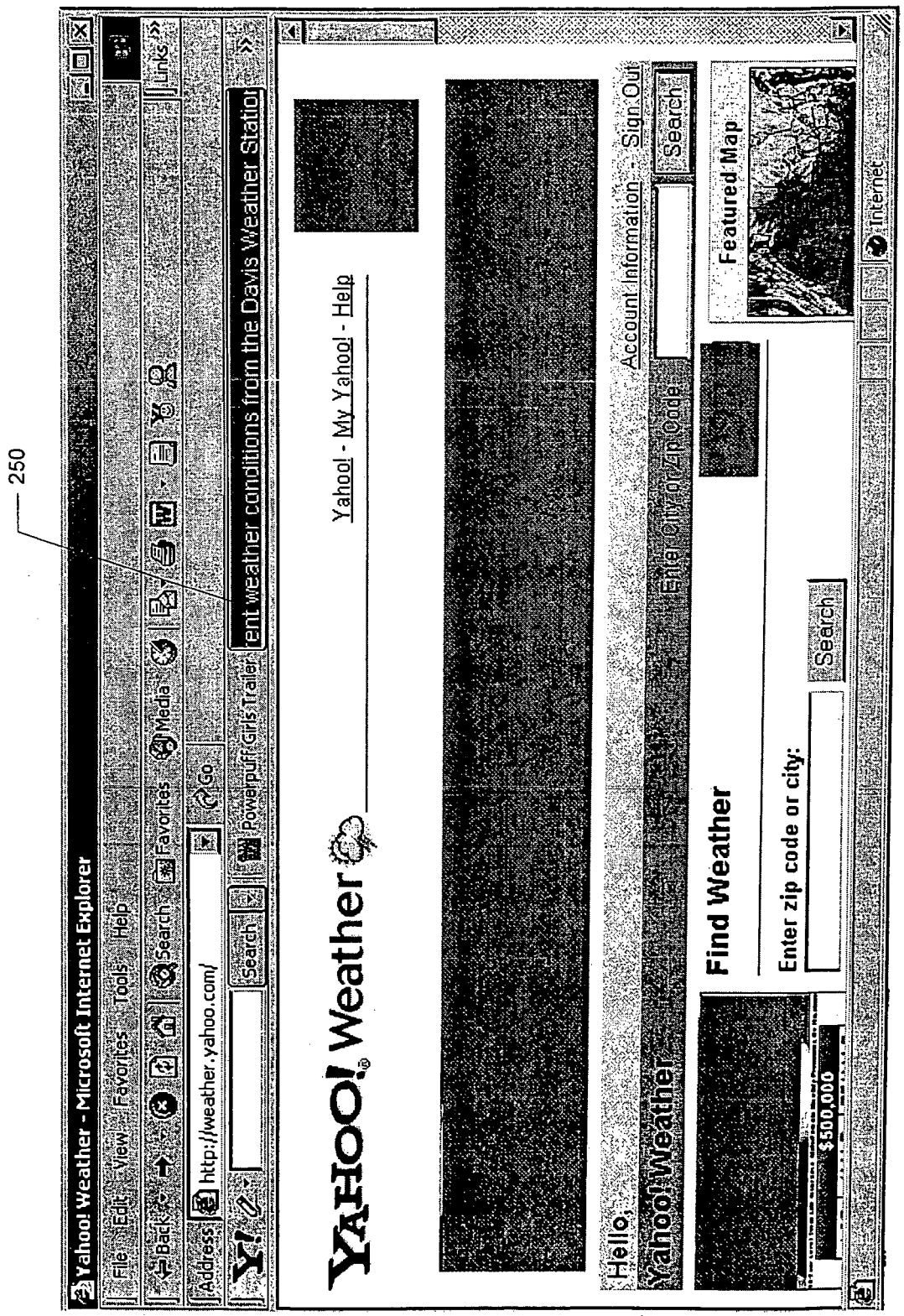
FIG. 7 is an exemplary screen shot illustrating a browser toolbar including miniature-browser buttons implemented according to an embodiment of the invention.

Information scroll button 250 is a BUTTON button that scrolls current weather conditions. FIGS. 2-8 illustrate information scroll button 250 at different display stages. The information scroll button 250 offers numerous improvements over a typical button because a greater amount of information can be displayed in the same amount of space as a typical button. In alternate embodiments the scrolling information may include stock prices, breaking news, or in certain embodiments the button can scroll a decorative design. As illustrated in FIG. 7, when a user selects button 250, the browser is navigated to a weather related Web page. In alternate embodiments a user could be directed to a Web page that is related to the information that is being scrolled. BUTTON buttons are not limited to the scrolling embodiment of button 250; they can be modified to include other browser related media, such as, for example applets and/or scripts. In addition, MENU or BUTTONMENU buttons are also capable of displaying scrolling information.

Figure 10:
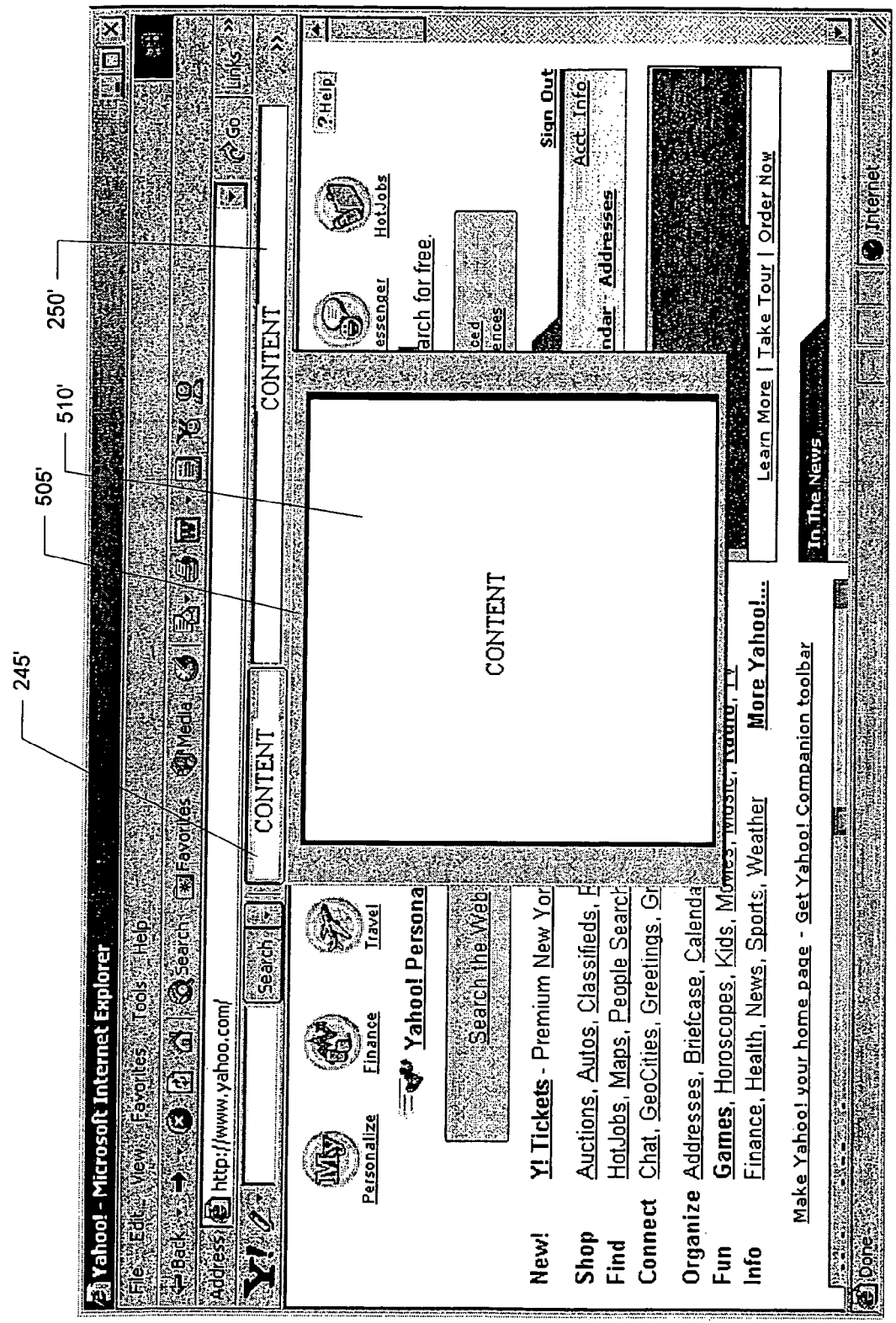
FIG. 10 is an exemplary screen shot illustrating a browser toolbar including miniature-browser buttons implemented according to an embodiment of the invention.

The invention is not limited to movie trailer buttons 245 and information scroll buttons 250. As illustrated in exemplary browser 200' of FIG. 10, any content that can be displayed in a browser window is displayable in a miniature-browser button. For example button content 245' may display a music player and selecting the button 245' opens menu 505', which displays content 510'. Content 510' may include a user interface for the music player, offering functionality such as loading new music, switching between play-lists, controlling the volume and/or equalization. In addition, button 250' may display an animated advertisement that attracts the attention of a user. Further implementations are also possible.

Figure 8:
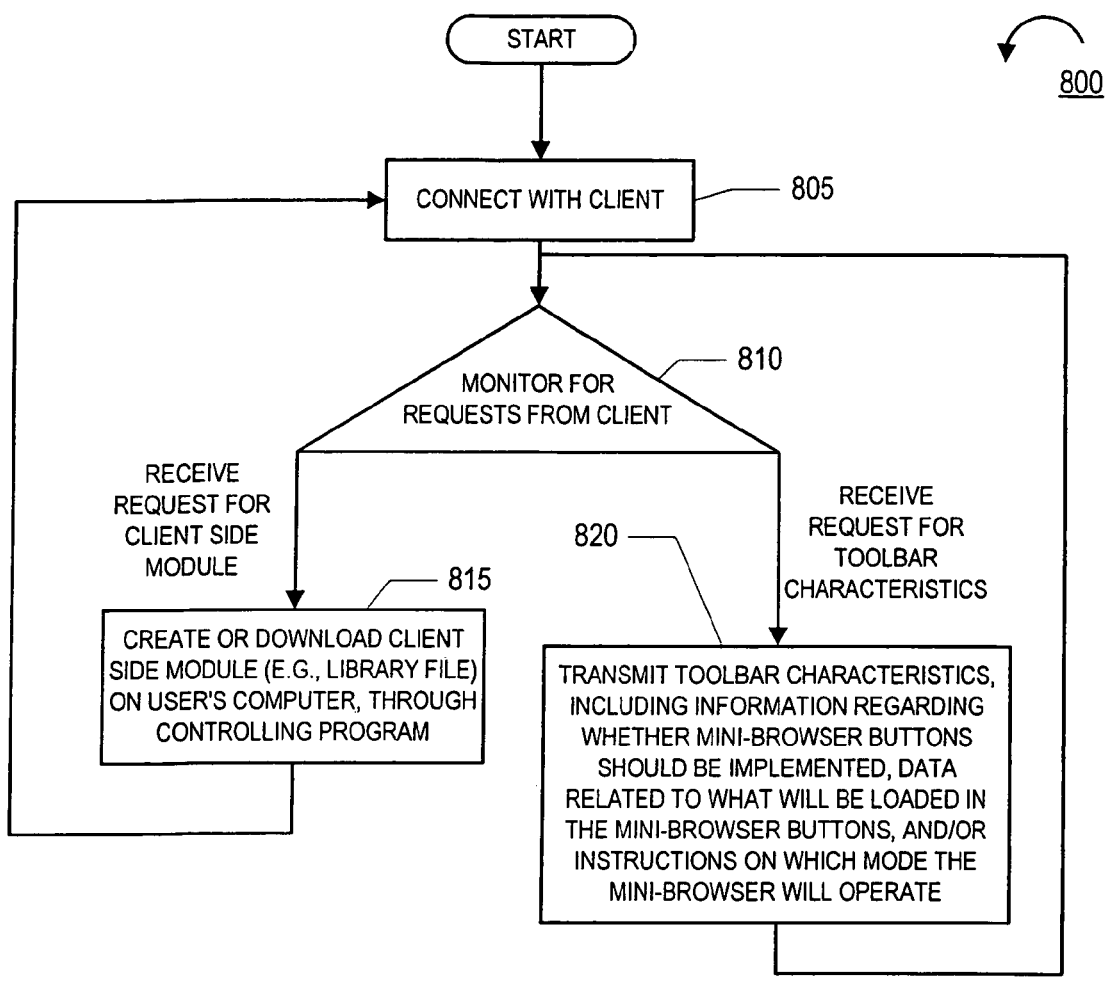
FIG. 8 is a flowchart illustrating an exemplary process of providing miniature-browser buttons according to an embodiment of the invention.

FIG. 8 illustrates an exemplary embodiment of a method 800 for a server side process for providing and implementing the invention. In an embodiment of the invention, a user desiring miniature-browser buttons would obtain, by, for example, downloading a client side module 174 from a content provider 120. This downloading can include the user accessing a content provider's Web page using an Internet browser. Therefore, processing of method 800 begins in step 805 with the content provider 120 connecting with a client computer 150, which may occur, for example, in response to a user visiting the content provider's Web page. Content provider 120 may connect with client computers 150 through a server 126. The server 126 may then provide the client computer 150 with, for example, a Web page including a number of different options such as creating a new account, signing into an existing account, and downloading a client-side module 174.

Processing proceeds from step 805 to step 810, where the server 126 monitors for requests from the client 150. When a request for a client-side module 174 is received, processing proceeds from step 810 to step 815. In step 815, through the controlling program 122, the server 126 creates or uploads a client-side module 174 to the user's computer 150. The client-side module 174 may be, for example, a library file implementing a downloadable toolbar, such as toolbar 240. In some embodiments, an installation process is initiated to install the toolbar in the user's computer 150.

After the toolbar is obtained by the client 150, and the toolbar is executed, for example, as part of the installation process of the toolbar or in response to the user subsequently executing a browser application, in an embodiment of the invention, the toolbar automatically (or otherwise) connects with a content provider 120. Thus, method 800 proceeds from step 815 to step 805 where the content provider 120 connects with the client 150. The content provider can be content provider 120, from which client-side module 174 is downloaded, or alternatively, the content provider can be another site, for example, content provider 130.

Processing proceeds from step 805 to step 810 where the server 126 monitors for requests from the client 150. When a request for toolbar characteristics is received, processing proceeds from step 810 to step 820, where the server 126 transmits the toolbar characteristics to the client 150. The request may be an explicit request for toolbar characteristics and/or a content provider may automatically send toolbar characteristics in response to a general request for toolbar content when client-side module 174 is initiated. In an embodiment, the toolbar characteristics are sent to the computer 150 through a button feed. The feed includes information regarding whether miniature-browser buttons should be implemented, data related to what will be loaded in the miniature-browser buttons, and instructions on which mode the miniature-browser will operate.

In certain embodiments, before the request for toolbar characteristics is received by the server 126, the user at client 150 can sign into or open a new account with the content provider 120. Having an account with the content provider 120 and allowing the content provider 120 to store button characteristics allows multiple users who use the same computer to each have personalized miniature-browser buttons when using the same computer. Another benefit of certain embodiments is that the same user can use his or her personalized button characteristics at different computers without having to re-set those characteristics at the different computers. Alternatively, if the client does not have an account with the content provider 120 or the client is not signed in, the content provider 120 may transmit standard or generic button characteristics. Alternatively, certain characteristics may be transmitted based upon the URI and/or ISP from which the user is accessing the Web site. Following step 820, processing returns to step 810, where the server 126 monitors for requests from the client 150. In some embodiments, the server 126 continues to monitor for requests from the client 150 until the client 150 signs out. The server 126 can also transmit toolbar characteristics to a user 150 to, for example, change the scrolling information or to alter the video displayed by a button, without receiving a request from the user.

Figure 9:
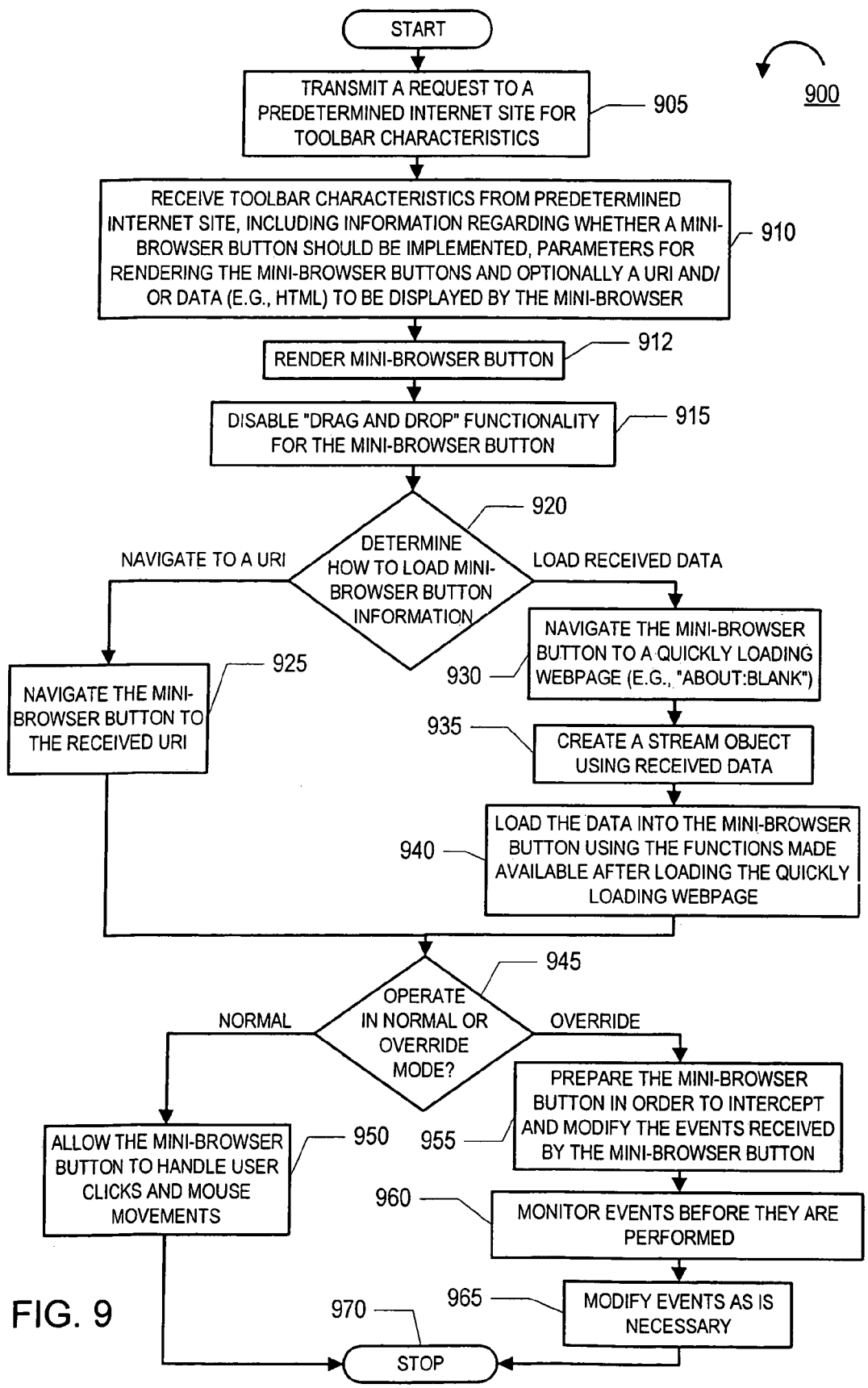
FIG. 9 is a flowchart illustrating an exemplary process of providing and implementing miniature-browser buttons according to an embodiment of the invention.

FIG. 9 illustrates an exemplary embodiment of a method 900 for providing and implementing miniature-browser buttons in accordance with the invention. In this embodiment the miniature-browser buttons are part of a downloadable toolbar 240 for a browser 200. The method 900 is initiated, for example, by client-side module 174, which was initiated with the initiation of a Web browser. The method starts in step 905, with the client 150 transmitting a request to a predetermined Internet site for toolbar characteristics. The request may be a generic request for toolbar characteristics for a particular user.

Processing proceeds from step 905 to step 910 where the client 150 receives toolbar characteristics from the predetermined Internet site, for example, as part of a button feed. The button feed includes instructions to the toolbar on how to display its buttons, menus and menu items. Since the downloadable toolbar can be customized to different users, instructions included in button feeds vary depending on the user of the toolbar. Therefore, the button feed includes parameters for rendering its buttons including, for example, the size, location, and/or category of the buttons and the text and images that is displayed in the buttons. Typically, the toolbar renders the buttons according to the instructions and displays the text and/or image received for the buttons, but according to an embodiment of the invention, the button feed can also include information directing the toolbar to render some or all of its buttons as miniature-browser buttons. In such embodiment, the button feed may also include a URI, which points to miniature-browser button data to be displayed in the button, and/or the button feed may include the data (for example, HTML, scripts, applets, etc.) itself. Instructions to the toolbar may be in the form of flags, numeric representations for instructions, executable computer code instructions, etc. In addition, the toolbar may determine what to display and in what mode depending on the data it receives. For example, if the toolbar receives text and an image for a button, then the button is rendered in a typical fashion, while if the toolbar receives certain HTML code, the button is rendered as a miniature-browser button.

If the feed does not include instruction to use miniature-browser buttons, the toolbar renders its buttons in the typical manner, for example by displaying the text and/or image received in the button feed for the button. If the button feed does include instructions to implement miniature-browser buttons, processing proceeds from step 910 to 912, where the toolbar renders some or all of its buttons as miniature-browser buttons. In one exemplary embodiment, the style and extended style fields in a button feed to the client's computer 150 indicate which buttons should be rendered using miniature-browser buttons. The toolbar renders miniature-browser buttons by creating an embedded ActiveX control of type CLSID_WebBrowser and activating it in-place in the toolbar using standard object linking and embedding (OLE) practices, or other such practices, now known, or hereafter developed, by those skilled in the art, as instructed by present disclosure.

After the miniature-browser button is created, processing proceeds from step 912 to step 915 where the "drag and drop" functionality for the miniature-browser button is disabled. Current Internet browsers allow users to "drag and drop" hyperlinks, images, etc., located in a first browser window into a second browser window and thereby navigate the second browser window to the selected hyperlink, image, or other valid drop item. This feature can be disabled in miniature-browser buttons, so a user cannot inadvertently change the content displayed in their miniature-browser buttons.

Following step 915, processing proceeds to step 920 where the toolbar determines how to load the content to be displayed in the miniature-browser button. In this exemplary non-limiting embodiment, the toolbar either receives a URI that is associated with previously created button characteristics, or it receives the data that it loads into the miniature-browser button. This URI or data, in certain embodiments, can be included in the URL field of a button feed to the client's computer 150. The feed also includes information instructing the toolbar how to load content into its miniature-browser buttons. For example, the button feed may include a flag indicating a URI or data, or the toolbar can decide based on the content it receives.

If the toolbar determines to load content into a miniature-browser button by navigating to a URI, processing proceeds from step 920 to step 925 where the miniature-browser button is navigated to the received URI. In an embodiment of the invention, this is accomplished by calling Navigate( ) on the Web browser control. In certain embodiments, the upper left hand corner of a Web page residing at the received URI is displayed in the miniature-browser button. For this reason, the Web page residing at the URI is preferably designed and implemented to work in conjunction with the miniature-browser button, such that, for example, information on the Web page is visible at the miniature-browser button. The Web page residing at the URI can be implemented using, for example, HTML, DHTML, Flash, animated GIFs, Java, etc, and can resided at content provider 120 or at another Internet location, such as, for example, content provider 130. These tools can be used to implement the movie trailer button and the information scroll button described above. Then, processing proceeds from step 925 to step 945, where the toolbar determines the user-interaction mode of the miniature-browser buttons.

Returning to step 920, if the toolbar determines to load received data (for example, raw HTML) into a miniature-browser button, processing proceeds from step 920 to step 930. In step 930, the miniature-browser button is navigated to a quickly loading Web page, such as, for example, "about: blank." Step 930 is performed because certain functions are only available to a browser after it has fully loaded a page. In an embodiment of the invention when, a DISPID_DOCU-MENTCOMPLETE event is received from the miniature-browser button, an HTMLDocument is valid and additional functions are available to the browser.

Processing proceeds from step 930 to step 935 where a stream object is created using the received data (for example, raw HTML). Then in step 940 the stream object is loaded into the miniature-browser button using functions made available after loading the quickly loading Web page. In an embodiment of the invention, the stream object is loaded using a Load( ) method of the IPersistStreamInit interface of the HTMLDocument2 object. The received data may be created using, for example, HTML, DHTML, Flash, animated GIFs, Java, etc. Then, processing proceeds from step 940 to step 945, where the toolbar determines the user-interaction mode of the miniature-browser buttons.

Once the miniature-browser button is displaying HTML or other rich content as described in the previous steps, processing proceeds to step 945 where the user-interaction mode is determined. In an exemplary embodiment, miniature-browser buttons operate in one of at least two user-interaction modes: normal mode, and override mode. The button feed includes information instructing the toolbar which mode to operate the miniature-browser buttons, in this example, the available modes are normal mode and override mode.

If the toolbar determines to operate the miniature-browser button in a normal mode, processing proceeds from step 945 to step 950, where the user's selections (for example mouse clicks) and mouse movements are handled by the miniature-browser button. Miniature-browser button events are not monitored or modified before being handled by the miniature-browser button. Then method 900 stops in step 970, for example, with the user logging out, or closing the browser.

Returning to step 945, if the toolbar determines to operate the miniature-browser button in an override mode, processing proceeds from step 945 to step 955, where the toolbar intercepts mouse events to the miniature-browser button and treats the miniature-browser button as though it were a typical toolbar button by, for example, preventing the mouse pointer from turning into a hand when it is positioned over a hyperlink displayed in a miniature-browser button. Thus, user interaction with the toolbar buttons remains continuous. In addition, URIs to which a miniature-browser button should navigate if selected, in override mode, are sent in a button feed similar to regular buttons. Therefore, the toolbar overrides and handles events, for example, navigating a user's main browser window to a URI associated with a shortcut button, otherwise handled by a miniature-browser button.

In step 955, the miniature-browser button is prepared to intercept and modify button event messages so that the toolbar can view a button's events before they are handled by the button. In an exemplary embodiment, messages are intercepted, as is known in the art, through window subclassing. The miniature-browser button is subclassed at the time the first DISPID_BEFORENAVIGATE2 event is received, i.e., the first time the browser window is available.

Processing proceeds from step 955 to step 960, where the miniature-browser button monitors events before they are performed. In an embodiment, subclassing the miniature-browser button allows button down/up/double-click messages, mouse moves, timer events, and SETCURSOR events to be viewed before they are implemented. When an event is received, processing proceeds to step 965, where the event is modified as necessary. In an embodiment, mouse click and movement messages are passed to the parent window, which is the toolbar. This window then handles the event as though the user interacted with a typical toolbar button or menu item.

For example, in OVERRIDE mode the toolbar overrides the normal mouse appearance so that user mouse movements over the miniature-browser button do not change the cursor to a hand when it is over a link. In an embodiment, this is accomplished by subclassing all the miniature-browser's child windows and handling the WM_SETCURSOR message. When this message is intercepted the operating system, (for example, Windows) is notified that the event has been handled and the event does not get passed to the browser, and therefore the cursor does not change. Method 900 ends in step 970, for example with a user logging out or closing the browser window.

While the embodiment above describes miniature-browser buttons for adding rich content to a downloadable toolbar, the invention is not limited to this case. Additionally, miniature-browser button functionality may include advertisements with previews of new Web sites displayed in the button or menu, instant message windows loaded directly in a toolbar and Internet journal entry forms. Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method comprising:
   receiving downloadable toolbar characteristics for a downloadable toolbar from a predetermined Internet site, the toolbar characteristics including button characteristics for at least one button implemented as a miniature-browser button, wherein the miniature-browser button comprises an Internet browser display window for displaying content using an embedded Web browser control, said browser window configured to display content, and the button characteristics include at least one of a universal resource identifier and loadable button content;
   defining a region on the downloadable toolbar to display the miniature-browser button as part of the downloadable toolbar;
   activating said embedded Web browser control in said region;
   disabling a browser function, including a drag and drop function, of the miniature-browser button to prevent change of the content displayed therein when the miniature-browser button is displayed;
   enabling the Web browser control to persist when an Internet site currently displayed is changed; and
   loading the button characteristics to enable operation of the miniature-browser button.

2. The method of claim 1, wherein the button characteristics include both a universal resource identifier and loadable button content.

3. The method of claim 1, wherein loading the button characteristics comprises:
   loading a quickly-loading Web page into the miniature-browser button;
   creating a stream object using the loadable button content; and
   loading the stream object into the miniature-browser button using functions made available after loading the quickly-loading Web page.

4. The method of claim 1, wherein the button characteristics include a user interaction mode for the miniature-browser button, wherein the miniature-browser button operates in either of a normal mode and an override mode.

5. The method of claim 4, wherein when the miniature-browser button operates in the normal mode, the method further comprises allowing the miniature-browser button to handle miniature-browser button events.

6. The method of claim 4, wherein when the miniature-browser button operates in the override mode, the method further comprises:
   enabling the miniature-browser button to intercept and modify miniature-browser button events;
   monitoring for a miniature-browser button event; and
   modifying the event so that the miniature-browser button operates in a different manner than it otherwise would if not in override mode.

7. The method of claim 6 wherein the event includes changing a mouse pointer cursor to a hand icon when the mouse pointer cursor is positioned over a hyperlink in the miniature-browser button, and wherein the event is modified so that the mouse pointer cursor remains a mouse pointer cursor when placed over a hyperlink in the miniature-browser button.

8. The method of claim 6, wherein an event that would occur in a first manner when the miniature-browser button is in normal mode is modified such that the event occurs in a second manner, different from the first manner, when the miniature-button browser is in override mode.

9. The method of claim 6, wherein the enabling the miniature-browser button includes subclassing the miniature-browser button.

10. The method of claim 1, further comprising disabling drag-and-drop functionality for the miniature-browser button.

11. The method of clam 1, wherein the downloadable toolbar is implemented using an ActiveX control.

12. The method of claim 1, wherein the universal resource identifier represents an address on the Internet where content to be loaded in the miniature-browser button is located.

13. The method of claim 1, further comprising sending updated downloadable toolbar characteristics from the Internet content provider which includes updated loadable button content.

14. The method of claim 1, further comprising sending updated downloadable toolbar characteristics from the Internet content provider including universal resource identifiers that represent an address on the Internet where new content to be loaded in the miniature-browser button is located.

15. The method of claim 1, wherein the content provider maintains a user account comprising user account information.

16. The method of claim 15, further comprising providing the user with the ability to log in to the content provider.

17. The method of claim 16, wherein the user account information comprises downloadable toolbar button characteristics specific to the user.

18. The method of claim 17, wherein content of the downloadable toolbar button characteristics is determined by the content provider based upon the user account information such that the button characteristics of the miniature browser button are personalized in accordance with specific preferences of the user.

19. The method of claim 18, wherein the user account information is maintained by the content provider, independent of a first computer having a first browser that the user utilizes, such that button characteristics of the miniature browser button remain personalized when the user utilizes a second computer having a second browser.

20. The method of claim 1, wherein the button characteristics cause scrolling information content to be displayed within the miniature-browser button.

21. The method of claim 20, wherein the scrolling information content includes a hyperlink that may be activated by the user.

22. The method of claim 20, wherein the scrolling information content includes plural content portions, each of the content portions containing a hyperlink that may be activated by the user.

23. The method of claim 1, wherein the button characteristics identify loadable button content to be displayed within the miniature-browser button.

24. The method of claim 23, wherein the loadable button content includes Web page content to be displayed within the miniature-browser button.

25. The method of claim 23, wherein the loadable button content includes an instant messaging window to be displayed within the miniature-browser button.

26. The method of claim 23, wherein the loadable button content includes a blog to be displayed within the miniature-browser button.

27. The method of claim 23, wherein the loadable button content includes an advertisement to be displayed within the miniature-browser button.

28. The method of claim 23, wherein the loadable button content includes a scrolling message to be displayed within the miniature browser button.

29. The method of claim 28, wherein the scrolling message includes a hyperlink.

30. The method of claim 28, wherein the scrolling message includes plural portions, each of the portions containing a hyperlink that may be activated by the user.

31. The method of claim 1, wherein the loadable button content includes Web page content to be displayed within the miniature-browser button.

32. The method of claim 1, wherein the loadable button content includes an instant messaging window to be displayed within the miniature-browser button.

33. The method of claim 1, wherein the loadable button content includes a blog to be displayed within the miniature-browser button.

34. The method of claim 1, wherein the loadable button content includes an advertisement to be displayed within the miniature-browser button.

35. The method of claim 1, wherein the loadable button content includes a scrolling message to be displayed within the miniature browser button.

36. The method of claim 35, wherein the scrolling message includes a hyperlink.

37. The method of claim 35, wherein the scrolling message includes plural portions, each of the portions containing a hyperlink that may be activated by the user.

38. The method of claim 1, wherein a plurality of additional miniature-browser buttons are implemented in the downloadable toolbar.

39. The method of claim 1, wherein the downloadable toolbar is a floating toolbar capable of being positioned independently of and apart from the Internet browser interface.

40. The method of claim 1, wherein the downloadable toolbar is positionally anchored to the Internet browser interface.

41. The method of claim 1, wherein the toolbar is visually integrated into the Internet browser interface.

42. A method comprising:
receiving downloadable toolbar characteristics from a predetermined Internet site, the toolbar characteristics including button characteristics for at least one button implemented as a miniature-browser button, wherein the miniature-browser button comprises an Internet browser display window for displaying content using an embedded Web browser control, said browser window configured to display content, and the button characteristics include at least one of a universal resource identifier and loadable button content;
defining a region on the downloadable toolbar to display the miniature-browser button as part of the downloadable toolbar;
activating said embedded Web browser control in said region;
disabling a browser function, including a drag and drop function, of the miniature-browser button to prevent change of the content displayed therein when the miniature-browser button is displayed;
enabling the Web browser control to persist when an Internet site currently displayed is changed; and
loading the button characteristics to enable operation of the miniature-browser button;
wherein content of the downloadable toolbar button characteristics are determined by the content provider based upon user account information such that the button characteristics of the miniature browser button are personalized in accordance with preferences of the user; and
wherein the user account information is maintained by the content provider, independent of a first computer having a first browser that the user utilizes, such that button characteristics of the miniature browser button remain personalized when the user utilizes a second computer having a second browser.

43. The method of claim 42, wherein personalized Web page content is displayed within the miniature-browser button.

44. The method of claim 42, wherein a personalized instant messaging window is displayed within the miniature-browser button.

45. The method of claim 42, wherein a personalized blog is displayed within the miniature-browser button.

46. The method of claim 42, wherein an advertisement is displayed within the miniature-browser button.

47. The method of claim 46, wherein the advertisement is targeted to the user based upon the user account information.

48. The method of claim 42, wherein a personalized scrolling message is displayed within the miniature browser button.

49. The method of claim 48, wherein the scrolling message is targeted to the user based upon the user account information.

50. A method comprising:
receiving downloadable toolbar characteristics from a predetermined Internet site, the toolbar characteristics including button characteristics for at least one button implemented with a miniature-browser button, wherein the miniature-browser button includes an Internet browser display window for displaying content using an embedded Web browser control, said browser window configured to display content, and the button characteristics include at least one of a universal resource identifier and loadable button content, the button content including advertisement content;
defining a region as part of the downloadable toolbar to display the miniature-browser button within the downloadable toolbar;
activating said embedded Web browser control in said region;
disabling a browser function, including a drag and drop function, of the miniature-browser button to prevent change of the content displayed therein when the miniature-browser button is displayed;
enabling the Web browser control to persist when an Internet site currently displayed is changed; and
loading the button characteristics to enable operation of the miniature-browser button such that at least a portion of the advertisement content is displayed within the miniature-browser button.

51. A system comprising:
one or more servers configured for:
sending downloadable toolbar characteristics from a predetermined Internet site, the toolbar characteristics including button characteristics for at least one button implemented as a miniature-browser button, wherein the miniature-browser button comprises an Internet browser display window for displaying content using an embedded Web browser control, said browser window configured to display content, and the button characteristics include at least one of a universal resource identifier and loadable button content;
wherein a region is defined on the downloadable toolbar to display the miniature-browser button as part of the downloadable toolbar;
said embedded Web browser control is activated in said region;
a browser function of the miniature-browser button is disabled, including a drag and drop function, to prevent change of the content displayed therein when the miniature-browser button is displayed;
the Web browser control is enabled to persist when an Internet site currently displayed is changed; and
button characteristics are loaded to enable operation of the miniature-browser button.

52. The system of claim 51, wherein the button characteristics include both a universal resource identifier and loadable button content.

53. The system of claim 51, wherein loading the button characteristics comprises:
loading a quickly-loading Web page into the miniature-browser button;
creating a stream object using the loadable button content; and
loading the stream object into the miniature-browser button using functions made available after loading the quickly-loading Web page.

54. The system of claim 51, wherein the button characteristics include a user interaction mode for the miniature-browser button, wherein the miniature-browser button operates in either of a normal mode and an override mode.

55. The system of claim 51, wherein the miniature-browser button operates in the normal mode, the method further comprising allowing the miniature-browser button to handle miniature-browser button events.

56. The system of claim 51, wherein when the miniature-browser button operates in the override mode, the server being further configured for:
enabling the miniature-browser button to intercept and modify miniature-browser button events;
monitoring for a miniature-browser button event; and
modifying the event so that the miniature-browser button operates in a different manner than it otherwise would if not in override mode.

57. The system of claim 51, wherein the event includes changing a mouse pointer cursor to a hand icon when the mouse pointer cursor is positioned over a hyperlink in the miniature-browser button, and wherein the event is modified so that the mouse pointer cursor remains a mouse pointer cursor when placed over a hyperlink in the miniature-browser button.

58. The system of claim 51, wherein an event that would occur in a first manner when the miniature-browser button is in normal mode is modified such that the event occurs in a second manner, different from the first manner, when the miniature-button browser is in override mode.

* * * * *